(12) United States Patent
Nakayasu

(10) Patent No.: US 7,325,883 B2
(45) Date of Patent: Feb. 5, 2008

(54) HYDRAULIC BRAKING SYSTEM FEATURING SELECTIVELY-COUPLED PUMP SUCTION CIRCUITS

(75) Inventor: Yuji Nakayasu, Troy, MI (US)

(73) Assignee: Continental Teves, Inc., Auburn Hills, MI (US)

( * ) Notice: Subject to any disclaimer, the term of this patent is extended or adjusted under 35 U.S.C. 154(b) by 31 days.

(21) Appl. No.: 10/958,003

(22) Filed: Oct. 4, 2004

(65) Prior Publication Data
US 2006/0071543 A1 Apr. 6, 2006

(51) Int. Cl.
*B60T 8/34* (2006.01)
(52) U.S. Cl. .................. 303/113.2; 303/11; 303/139
(58) Field of Classification Search ............... 303/9.63, 303/11, 139, 140, 188, 113.2
See application file for complete search history.

(56) References Cited

U.S. PATENT DOCUMENTS

| | | | |
|---|---|---|---|
| 4,824,183 A | 4/1989 | Uchida et al. | |
| 5,540,488 A | 7/1996 | Terazawa et al. | |
| 6,120,111 A | 9/2000 | Sakai | |
| 6,280,006 B1 * | 8/2001 | Kobayashi et al. | 303/139 |
| 6,805,415 B2 * | 10/2004 | Isono et al. | 303/122.11 |
| 6,896,338 B2 * | 5/2005 | Nakayasu et al. | 303/116.1 |
| 6,957,872 B2 * | 10/2005 | Moradmand et al. | 303/116.2 |

* cited by examiner

*Primary Examiner*—Bradley King
(74) *Attorney, Agent, or Firm*—Brinks Hofer Gilson & Lione

(57) ABSTRACT

An automotive braking system controls the flow of pressurized brake fluid from a tandem master cylinder to several wheel brakes via a pair of braking circuits. Each circuit features a pressure relief line having, in series, a normally-closed valve, low-pressure accumulator, check valve, pump, damping chamber, and throttling orifice. A bypass line including a normally-closed bypass valve that is operated to interconnect the pressure relief lines of the first and second braking circuits proximate to the suction side of the pump, preferably downstream of the wheel brake outlet valves between the low-pressure accumulator and the check valve, selectively feeds fluid from one braking circuit to the other braking circuit to thereby reduce system response time when, for example, one or more wheel brakes driven by the other braking circuit is actuated to enhance vehicle traction or stability.

8 Claims, 1 Drawing Sheet

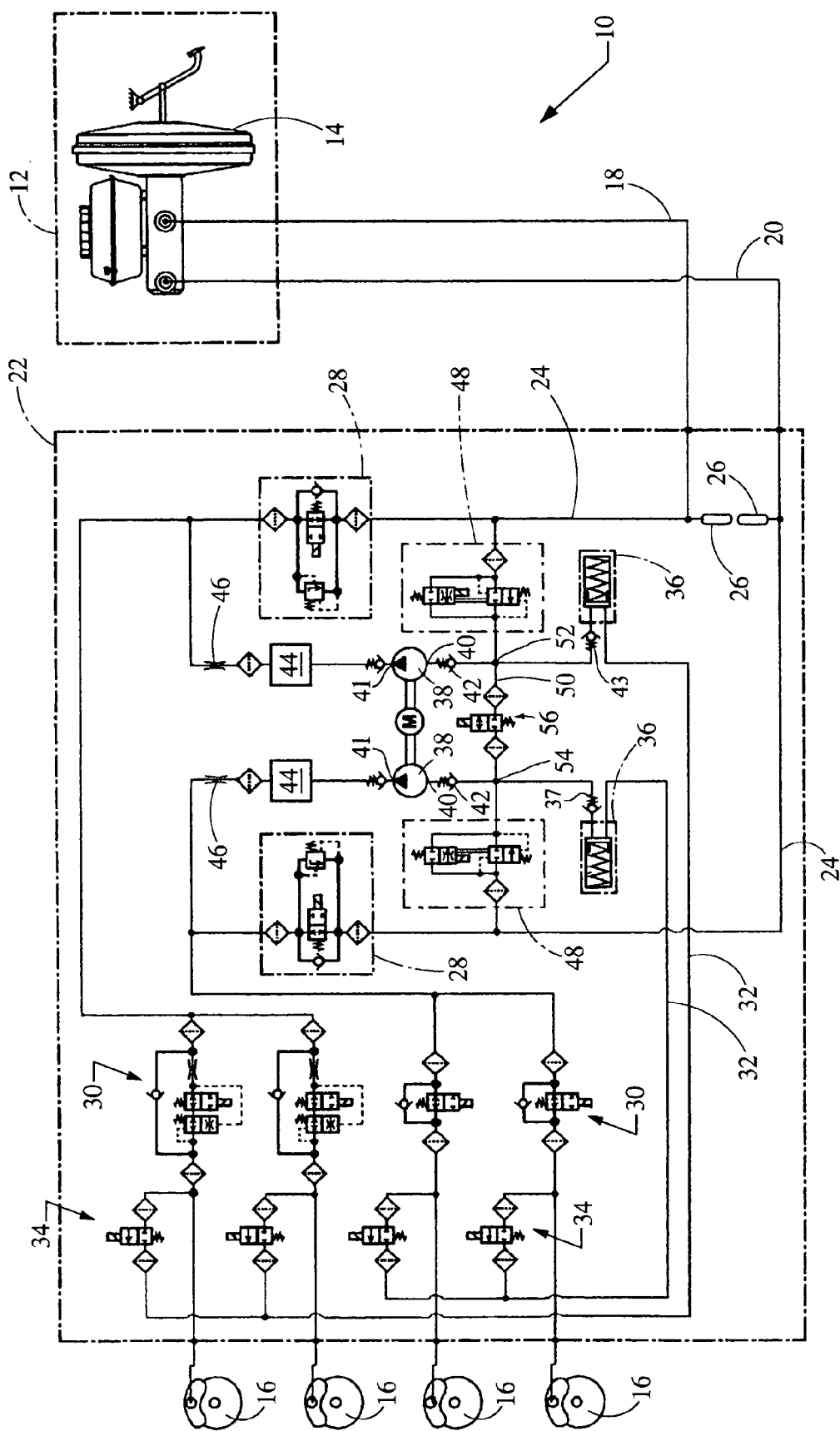

HYDRAULIC BRAKING SYSTEM FEATURING SELECTIVELY-COUPLED PUMP SUCTION CIRCUITS

FIELD OF THE INVENTION

The invention relates to dual-circuit hydraulic braking systems for a motor vehicle that are controlled to enhance vehicle traction or stability.

BACKGROUND OF THE INVENTION

Modern dual-circuit hydraulic braking systems for automotive applications typically include an operator-actuated brake actuation unit, such as a tandem master cylinder actuated by a booster-aided brake pedal, by which to supply a first pressurized fluid to each of a first pair of wheel brakes via a first or "primary" braking circuit, and a second pressurized fluid to each of a second pair of wheel brakes via a second or "secondary" braking circuit. The use of wholly redundant braking circuits for operating discrete pairs of wheel brakes ensures continued vehicle braking capability, notwithstanding a degradation of performance of the one of the braking circuits.

In order to achieve an "anti-lock" braking system, each braking circuit often features a normally-open electrically-operated inlet valve controlling the flow of pressurized fluid to each wheel brake, while a pressure relief line that includes a normally-closed electrically-operated outlet valve, a return pump, and a check valve controls the return of pressurized fluid from the wheel brake to the brake line upstream of the inlet valve.

Increasingly, such anti-lock braking systems (ABS) are used in a traction control system (TCS) mode. The further addition of a steering angle sensor, a vehicle yaw rate sensor, and a lateral vehicle acceleration sensor enables such anti-lock braking systems to operate in an "electronic stability program" (ESP) mode or, more generally, an automatic yaw control system, wherein a braking system controller selectively energizes each circuit's electrically-operated valves when the controller identifies an opportunity to enhance vehicle stability through a selective application of the vehicle's brakes. In addition to automatic yaw control, motor vehicles may also be equipped with anti-rollover protection (ARP) systems which utilize the sensor inputs mentioned above. A "separation" or "isolation" valve, located in the brake line of each circuit upstream of the location at which the pressure relief line connects to the brake line, serves to isolate the brake line from the master cylinder, for example, during TCS/ESP operation to allow the pump to increase wheel brake pressures independent on the master cylinder pressure.

In order to control the fluid pressure in TCS, ESP, ARP, and other such "active braking" modes, a hydraulic pump is typically placed in the pressure relief line of each circuit downstream of the outlet valve to return pressurized fluid to the circuit's brake line. The pump also serves to provide an increasing rate of fluid pressure upon the closing of the isolation valve to provide a sufficient braking system response time during active braking, even at a time when the brake fluid has a relatively-high viscosity due, for example, to low brake fluid temperatures.

The prior art has recognized, however, that a quicker system response is desirable during active braking modes. By way of example, a rapid pressure build up in one or the other braking circuit is particularly desirable upon commencing vehicle stability control in order to correct oversteer or understeer conditions. Accordingly, the prior art teaches the addition of a braking circuit pre-charging function to the brake actuation unit, i.e., to the vacuum booster of the master cylinder, in order to increase system response at the time such vehicle stability control is commenced. Alternatively, an additional pre-charging pump is provided in one or both braking circuits to ensure a sufficient increasing rate of fluid pressure at the commencement of vehicle stability control enhancement.

Unfortunately, the addition of the pre-charge function to the master cylinder, or of an additional pre-charging pump to one or both braking circuits, adds significant cost, weight, and complexity to the braking system.

SUMMARY OF THE INVENTION

It is an object of the invention to provide a hydraulic braking system that provides a rapid pressure build-up of hydraulic fluid, for example, for use with such active braking operating modes as vehicle traction control or stability control, that overcomes the deficiencies of the prior art.

It is also an object of the invention to provide a hydraulic braking system that features an increased system response relative to braking systems incorporating a pre-charging function when the brake fluid has a relatively-high fluid viscosity, as when brake fluid temperature is low.

A further object of the invention is to provide a method for providing a rapid build-up of hydraulic pressure in a selected braking circuit of a dual-circuit braking system upon operation of the selected braking circuit's isolation valve.

Yet another object of the invention is to provide a method of operating a hydraulic braking system to provide an improved system response time, for example, when the braking system is operated to enhance vehicle traction or stability.

In accordance with an aspect of the invention, a dual-circuit hydraulic braking system includes a shunt or bypass line that interconnects the pressure relief lines of the braking system's primary and secondary braking circuits between an normally-closed electrically-operated outlet valve and the suction side of a pump respectively disposed in each circuit's pressure relief line, preferably downstream of a one-way check valve disposed immediately downstream of a low-pressure accumulator. A normally-closed electrically-operated bypass valve disposed in the bypass line is operated by a system controller to interconnect the braking circuits and allow fluid from one braking circuit to flow into the other braking circuit at a bypass location on the second circuit's pressure relief line upstream of the second circuit's pump inlet when, for example, a controller identifies the desirability of quickly building up hydraulic pressure in one or both of the other circuit's wheel brakes during a vehicle traction control or stability control mode of system operation.

In accordance with a further aspect of the invention, a method for operating a dual-circuit hydraulic braking system includes interconnecting the system's primary and secondary braking circuits between a normally-closed wheel brake outlet valve and the suction side of a pump, respectively disposed in each braking circuit's pressure relief line. In an exemplary method, interconnecting the braking circuits includes opening a normally-closed electrically-operated bypass valve disposed in the bypass line to interconnect the braking circuits and allow low-pressure fluid from the first braking circuit to supplement the low-pressure feed to the second circuit's pump inlet when, for example, a controller identifies the desirability of quickly building up hydraulic pressure in one or both of the other circuit's wheel brakes during a vehicle traction control or stability control mode of system operation.

Additional features, benefits, and advantages of the invention will become apparent to those skilled in the art to which the invention relates from the subsequent description of several exemplary embodiments and the appended claims, taken in conjunction with the accompanying Drawings.

BRIEF DESCRIPTION OF THE DRAWING

The Drawing is a schematic view of an exemplary braking system in accordance with the invention in which a bypass line with a normally-closed electrically-operated valve directly couples the pressure relief lines of the unit's primary and secondary braking circuits, immediately upstream of their respective pump inlets.

DETAILED DESCRIPTION OF THE INVENTION

Referring to the Drawing, an exemplary dual-circuit hydraulic braking system 10 in accordance with the invention controls the flow of pressurized brake fluid from a brake actuation unit 12, such as a pedal-operated tandem master cylinder 14 that includes a vacuum brake booster by which to amplify the applied pedal force, to several wheel brakes 16 via a pair of braking circuits 18,20 conveniently housed within a hydraulic control unit 22. Each braking circuit 18,20 features a brake line 24 that receives pressurized fluid from the master cylinder 14 through a pulsation damper 26. Each brake line 24 includes a normally-open electrically-operated isolation valve 28 whose operation is controlled by a system controller (not shown). Each brake line 24 is also selectively connected to each of a pair of wheel brakes 16 through a dedicated normally-open electrically-operated inlet valve 30, also operated by the system controller, to achieve anti-lock vehicle braking, vehicle traction control, and/or vehicle electronic stability control.

Each braking circuit 18,20 of the first braking system 10 also features a pressure relief line 32 that selectively receives pressurized fluid from each of the braking circuit's wheel brakes 16 through a respective, dedicated normally-closed electrically-operated outlet valve 34, similarly under microprocessor control. The pressure relief line 32 is connected to the brake line 24 between the isolation valve 28 and the wheel brake inlet valves 30, and further typically includes a reservoir or low-pressure accumulator 36, a first check valve 37 immediately downstream of the low-pressure accumulator 36, and a reciprocating pump 38 having an inlet 40, an outlet 41, and a pair of check valves 42,43 disposed on either side of the pump 38 to prevent reverse fluid flow through the pump 38.

Each pressure relief line 32 also includes a damping chamber 44 and a throttling orifice 46, each located downstream of the pump outlet 41, which operate to smooth fluid pressure spikes in the brake line 24. A normally-closed electronic shuttle valve 48 controls the flow of brake fluid from the brake line 24 upstream of the isolation valve 28 to the suction side of the pump 38.

In accordance with an aspect of the invention, the braking system 10 further includes a bypass line 50 interconnecting the first and second braking circuits 18,20 at a respective bypass location 52,54 located between the isolation valve 28 and the suction side of the pump 38. While the invention contemplates locating the bypass locations 52,54 at any suitable location along each braking circuit's pressure relief line, in the exemplary braking system 10, each bypass location 52,54 is respectively positioned downstream of the wheel brake outlet valve 34 between the low-pressure accumulator 36 and the check valve 42 feeding the pump inlet.

The bypass line 50 includes a normally-closed electrically-operated bypass valve 56. When the controller selectively opens the bypass valve 56, the pressure relief lines 32 of the respective braking circuits 18,20 are directly interconnected to thereby allow fluid flow through the bypass line 50 from one braking circuit (for example, the first braking circuit 18) to augment the pump input of the other braking circuit (for example, the second braking circuit 20). Preferably, the controller operates the bypass valve 56 over time such that the pressure relief lines 32 of both braking circuits 18,20 "feed" the suction side of one braking circuit's pump 38 for fifty-percent (50%) of the time, and feeding the suction side of the other braking circuit's pump 38 for fifty-percent (50%) of the time. In this manner, brake system response time is reduced when, for example, one or more wheel brakes 16 of a given braking circuit 18,20 are actuated to enhance vehicle traction or stability.

In operation, when the controller determines that additional fluid flow in one or the other braking circuits 18,20 is desirable, for example, when the controller determines that an actuation of one or more wheel brakes 16 is desirable to enhance vehicle traction or stability control, the controller closes the isolation valves 28 and then selectively opens the bypass valve 56 to directly interconnect the two pressure relief lines at the respective bypass locations 52,54. Thus interconnected, flow to the suction side of one of the pumps 38 is enhanced to thereby reduce suction-side resistance, whereby the pump 38 is able to rapidly build up fluid pressure at one or both of its respective wheel brakes 16. It is noted that the source fluid from the one braking circuit 18,20 may be either fluid "dumped" from the wheel brake cylinders during an ABS mode, or supply fluid from the master cylinder during TCS/ESP modes.

The foregoing detailed description describes only a few of the many forms that the invention can take and should therefore be taken as illustrative rather than limiting. Thus, for example, while the disclosed braking system 10 conveniently house the several components of both primary and secondary braking circuits 18,20, as well as those of the bypass line 50, within a hydraulic control unit 22, the invention contemplates any suitable packaging of the braking system's several components, including definition of the bypass line 50 externally of a housing that otherwise defines the system's primary and secondary circuits 18,20. Similarly, while the disclosed braking system 10 employs a tandem master cylinder 14 as the brake actuation unit 12, the invention contemplates any suitable driver-actuated fluid pressure generator, including suitable "brake-by-wire" systems, with which to generate a pair of pressurized fluid outputs in response to a braking signal.

What is claimed is:

1. A hydraulic braking system for supplying a first and second pressurized fluid from a tandem master cylinder to a first and second wheel brake, the braking system comprising:
   a first braking circuit including a first brake line receiving the first pressurized fluid from the master cylinder through a first normally-open isolation valve and selectively connected to the first wheel brake through a first normally-open inlet valve, and a first pressure relief line selectively connected to the first brake line downstream of the first inlet valve through a first normally-closed outlet valve, wherein the first pressure relief line includes a first pump having an inlet and an outlet;

a second braking circuit including a second brake line receiving the second pressurized fluid from the master cylinder through a second normally-open isolation valve and selectively connected to a second wheel brake through a second normally-open inlet valve, and a second pressure relief line selectively connected to the second brake line downstream of the second inlet valve through a second normally-closed outlet valve, wherein the second pressure relief line includes a second pump having an inlet and an outlet; and a bypass line having two operative connections connecting the first braking circuit to the second braking circuit, wherein the bypass line includes only one electrically-operated bypass valve, the electrically-operated bypass valve being normally-closed, and the bypass line being operatively connected at one connection to the first braking circuit at a bypass location on the first pressure relief line downstream of the first outlet valve and upstream of the inlet of the first pump, and the bypass line being operatively connected at the other connection to the second braking circuit at a bypass location on the second pressure relief line downstream of the second outlet valve and upstream of the inlet of the second pump, whereby opening the electrically-operated bypass valve establishes a single fluid flow path between the first and second pressure relief lines.

2. A braking system according to claim 1, wherein the first pressure relief line further includes a first check valve preventing reverse flow in the first pressure relief line, and wherein the bypass location on the first pressure relief line is upstream of the first check valve.

3. A braking system according to claim 2, wherein the first pressure relief line further includes a second check valve upstream of the inlet of the first pump, and wherein the bypass location on the first pressure relief line is downstream of the second check valve.

4. In a hydraulic braking system for supplying a first and second pressurized fluid from a tandem master cylinder to a first and second wheel brake, the braking system Including a first and second braking circuit, each braking circuit having a brake line receiving pressurized fluid from the master cylinder through a normally-open isolation valve and selectively connected to a respective one of the wheel brakes through a normally-open inlet valve, each braking circuit further having a pressure relief line selectively receiving pressurized fluid from the respective one of the wheel brakes through a normally-closed outlet valve, each pressure relief line including a pump having an inlet and an outlet, the improvement comprising:

a bypass line directly interconnecting the first and second braking circuits at a respective bypass location on the respective pressure relief lines between the outlet valve and the pump inlet, the bypass line establishing a single fluid flow path between the respective pressure relief lines, wherein the bypass line includes only one electrically-operated bypass valve, the electrically operated bypass valve being normally-closed; and a controller arranged to open the bypass valve to allow a direct flow of fluid through the bypass line from one braking circuit to the other braking circuit upon identification of a demand condition.

5. A braking system according to claim 4, wherein each pressure relief line includes a check valve preventing reverse flow through the pump, and wherein the bypass location of each braking circuit is upstream of the respective check valve of each pressure relief line.

6. In a hydraulic braking system for supplying a first and second pressurized fluid from a tandem master cylinder to a first and second wheel brake, wherein the braking system includes a first and second braking circuit; each braking circuit having a brake line receiving pressurized fluid from the master cylinder through a normally-open isolation valve and selectively connected to a respective one of the wheel brakes through a normally-open inlet valve, and each braking circuit further having a pressure relief line selectively receiving pressurized fluid from the respective one of the wheel brakes through a normally-closed outlet valve, wherein the pressure relief line includes a pump having an inlet and an outlet, a method for increasing an available flow of pressurized fluid to the second wheel brake upon operation of the isolation valve of the second braking circuit comprising:

directly interconnecting the first and second braking circuits at a respective bypass location on the pressure relief line of each braking circuit upstream of the pump inlet by means of a bypass line forming a single fluid flow path between the pressure relief lines, the bypass line including only one electrically-operated bypass valve, the electrically-operated bypass valve being normally-closed, whereby opening the electrically-operated bypass valve directs an unaccumulated flow of pressurized fluid from one braking circuit to the other braking circuit.

7. A method according to claim 6, including opening the single normally-closed electrically-operated bypass valve disposed in the bypass line connecting the respective bypass locations of each pressure relief line in order to interconnect the first and second braking circuits.

8. A method according to claim 6, further including determining a braking system condition requiring a rapid pressure build-up of hydraulic fluid in the second braking circuit, and wherein the first and second braking circuits are interconnected when the rapid pressure build-up is required.

* * * * *